(12) United States Patent
Stephens

(10) Patent No.: US 7,423,968 B2
(45) Date of Patent: Sep. 9, 2008

(54) SYSTEMS AND METHODS TO CONVEY ADDITIONAL SIGNALING INFORMATION IN A WIRELESS LOCAL AREA NETWORK

(75) Inventor: Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 10/806,893

(22) Filed: Mar. 23, 2004

(65) Prior Publication Data

US 2005/0152357 A1 Jul. 14, 2005

Related U.S. Application Data

(60) Provisional application No. 60/536,071, filed on Jan. 12, 2004.

(51) Int. Cl.
*G01R 31/08* (2006.01)

(52) U.S. Cl. .................. 370/235; 370/349; 370/522; 370/524; 375/299; 375/347

(58) Field of Classification Search .............. 370/473, 370/503, 504, 389, 235, 349, 509, 510–514, 370/516, 522, 528, 529, 535, 537
See application file for complete search history.

(56) References Cited

U.S. PATENT DOCUMENTS

2002/0009055 A1* 1/2002 Sugaya .................. 370/252

OTHER PUBLICATIONS

"International Search Report for corresponding PCT Application No. PCT/US2005/001528", (Jun. 2, 2005), 4 pgs.

"Supplement to IEEE Standard for Information Technology-Telecommunications & Information Exchange Between Systems—Local and Metropolitan Area Networks—Specific Requirements. Part 11:Wireless LAN Medium Access Control (MAC) and Physical Layer (PHY) Specifications: High-Speed Physical Layer in 5GHZ Band", *IEEE Std 802.11A-1999*, The Institute of Electrical and Electronics Engineers, Inc., (Dec. 30, 1999), 90 pgs.

Chung, C., et al., "Estimation of Delay Offset in Multi-Carrier Differential Phase Modulation Systems", *Communication Technology Proceedings of ICCT2003*, 2, (2003), 1848-1851.

"U.S. Appl. No. 10/880,158 Preliminary Amendment filed Jul. 29, 2004", 3 pgs.

"U.S. Appl. No. 10/880,158 Supplemental Preliminary Amendment filed Nov. 18, 2004", 3 pgs.

* cited by examiner

*Primary Examiner*—Seema S. Rao
*Assistant Examiner*—Wanda Z Russell
(74) *Attorney, Agent, or Firm*—Schwegman, Lundberg & Woessner, P.A.; Gregory J. Gorrie

(57) ABSTRACT

A high-throughput communication station conveys additional signaling information by transmitting a high-throughput packet with a time offset between some portions of the packet transmitted on a first subchannel and some portions of the packet transmitted on a second subchannel. The time offset may convey additional signaling information to a receiving station.

31 Claims, 4 Drawing Sheets ance with some embodiments of the present invention; and

SYSTEMS AND METHODS TO CONVEY ADDITIONAL SIGNALING INFORMATION IN A WIRELESS LOCAL AREA NETWORK

CROSS-REFERENCE TO RELATED APPLICATIONS

This application claims the benefit of priority under 35 U.S.C. 119(e) to U.S. Provisional Patent Application Ser. No. 60/536,071, filed Jan. 12, 2004, which is incorporated herein by reference. communications, and in some embodiments, to multicarrier communications.

BACKGROUND

In wireless local area networks (WLANs), high-throughput communications station may need to convey additional signaling information for communicating high-throughput packets over a wideband channel. This additional signaling information should be compatible with conventional (e.g., non-high-throughput) communication stations so that these conventional communication stations may perform signaling and medium reservations functions.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
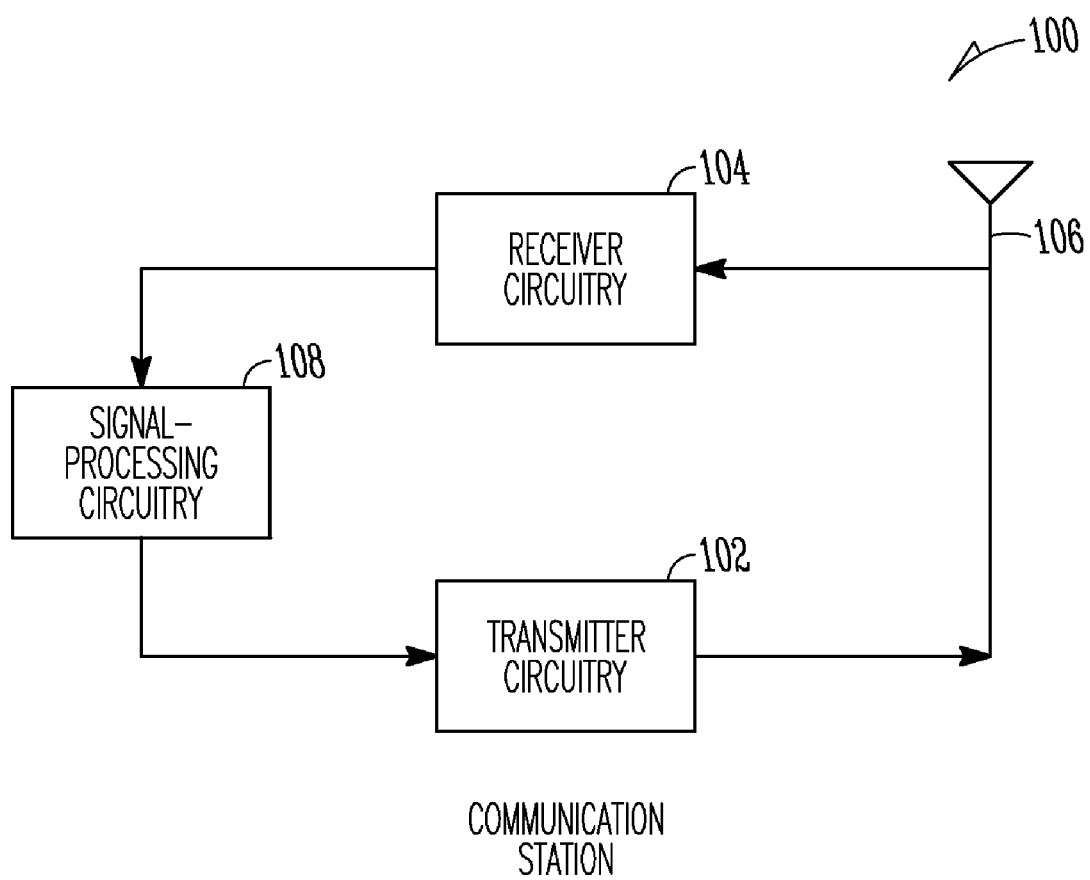
FIG. 1 is a block diagram of a high-throughput communication station in accordance with some embodiments of the present invention.

FIG. 1 is a block diagram of a high-throughput communication station in accordance with some embodiments of the present invention. High-throughput communication station 100 may be a wireless communication device and may transmit and/or receive wireless communications signals with transmitter circuitry 102 and/or receiver circuitry 104 using one or more antennas 106.

Signal processing circuitry 108 may process digital signals provided by receiver circuitry 104. Signal processing circuitry 108 may also provide digital signals to transmitter circuitry 102 for transmission by one or more of antennas 106. In some embodiments, receiver circuitry 104 and transmitter circuitry 102 may be cumulatively referred to as transceiver circuitry.

In some embodiments, communication station 100 may be referred to as a receiving station, and in some embodiments, communication station 100 may be referred to as a transmitting station. In some embodiments, communication station 100 may communicate orthogonal frequency division multiplexed (e.g., OFDM) communication signals with one or more other communication stations as described in more detail below.

In accordance with some embodiments of the present invention, high-throughput communication station 100 may convey additional signaling information by transmitting a high-throughput packet with a time offset between some portions of the packet transmitted on a first subchannel of a high-throughput channel and some portions of the packet transmitted on a second subchannel of the high-throughput channel. The presence of the time offset may convey additional signaling information to a receiving station. In some embodiments, processing circuitry 108 may instruct transmitter circuitry 102 to transmit the high-throughput packet with the time offset to convey additional signaling information to another communication station. The first and second portions of the packet may be compatible with conventional communication stations operating in either of the subchannels allowing these conventional communication stations to perform signaling and medium reservations functions for the subchannels.

In accordance with some embodiments of the present invention, additional signaling information may be conveyed to high-throughput communication station 100 by receiving a high-throughput packet with a time offset between some portions of the packet received on a first subchannel and some portions of the packet received on a second subchannel. In some embodiments, receiver circuitry 104 may receive the high-throughput packet and processing circuitry 108 may identify the second time offset and determine the additional signaling information.

Examples of the additional signaling information may include subsequent encoding of data portions of the high-throughput packet, including, for example, modulation type, spatial channel information, or other signaling information. In some embodiments, high-throughput communication station 100 may communicate packet formats that may be compatible with conventional (i.e., non-high-throughput) communication stations and may also communication packet formats that may not be computable with conventional communication stations. In these embodiments, a high-throughput communication station receiving portions of the packet may use the additional signaling information to interpret portions of the packet as either in a format compatible with convention communication stations or in a format not compatible with conventional communication stations.

In some embodiments, communication station 100 may communicate with one or more other communication stations over an OFDM communication channel. In some embodiments, the OFDM communication channel may comprise either a standard-throughput channel or a high-throughput communication channel. In these embodiments, the standard-throughput channel may comprise one subchannel and the high-throughput channel may comprise a combination of one or more subchannels and one or more spatial channels associated with each subchannel. Spatial channels may be non-orthogonal channels (i.e., not separated in frequency) associated with a particular subchannel in which orthogonality may be achieved through beamforming and/or diversity.

The subchannels may be frequency-division multiplexed (i.e., separated in frequency with other subchannels) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between closely spaced subcarriers, in some embodiments, the subcarriers of a particular subchannel may have a null at substantially a center frequency of the other subcarriers of that subchannel.

In some embodiments, a high-throughput communication channel may comprise a wideband channel having up to four frequency separated subchannels, a multiple-input-multiple-output (MIMO) channel comprising a single subchannel having up to four spatial channels, or a wideband-MIMO channel comprising two or more frequency separated subchannels where each subchannel has two or more spatial channels. In these embodiments, a wideband channel may have a wideband channel bandwidth of up to 80 MHz and may comprise up to four of the subchannels, although the scope of the invention is not limited in this respect. The subchannels may have a subchannel bandwidth of approximately 20 MHz, although the scope of the invention is not limited in this respect. In some embodiments, a high-throughput channel may have a bandwidth of approximately 40 MHz and may be comprised of two subchannels.

In some embodiments, communication station 100 may comprise more than one of antennas 106 to communicate over more than one spatial channel within a subchannel and/or more than one subchannel. In these embodiments, the OFDM communication channel may be a high-throughput communication channel.

In some embodiments, the frequency spectrums for an OFDM communication channel may comprise subchannels in either a 5 GHz frequency spectrum or a 2.4 GHz frequency spectrum. In these embodiments, the 5 GHz frequency spectrum may include frequency bands from approximately 4.9 to 5.9 GHz, and the 2.4 GHz spectrum may include a frequency band ranging from approximately 2.4 to 2.5 GHz, although the scope of the invention is not limited in this respect, as other frequency spectrums may be equally suitable.

In some embodiments, communication station 100 may be a personal digital assistant (PDA), a laptop or portable computer with wireless-networking communication capability, a web tablet, a wireless telephone, a wireless headset, a pager, an instant messaging device, a digital camera, an access point or other device that may receive and/or transmit information wirelessly. In some embodiments, communication station 100 may transmit and/or receive radio-frequency (RF) communications in accordance with specific communication standards, such as the Institute of Electrical and Electronics Engineers (IEEE) standards including IEEE 802.11 (a), 802.11 (b), 802.11 (g/h), and/or 802.11 (n) standards for wireless local area networks. In other embodiments, communication station 100 may transmit and/or receive communications in accordance with other techniques including the Digital Video Broadcasting Terrestrial (DVB-T) broadcasting standard, and the High performance radio Local Area Network (HiperLAN) standard.

Although communication station 100 is illustrated as having several separate functional elements, one or more of the functional elements may be combined and may be implemented by combinations of software-configured elements, such as processing elements including digital signal processors (DSPs), and/or other hardware elements. For example, the circuitry illustrated may comprise processing elements which may comprise one or more microprocessors, DSPs, application specific integrated circuits (ASICs), and combinations of various hardware and logic circuitry for performing at least the functions described herein.

Figure 2:
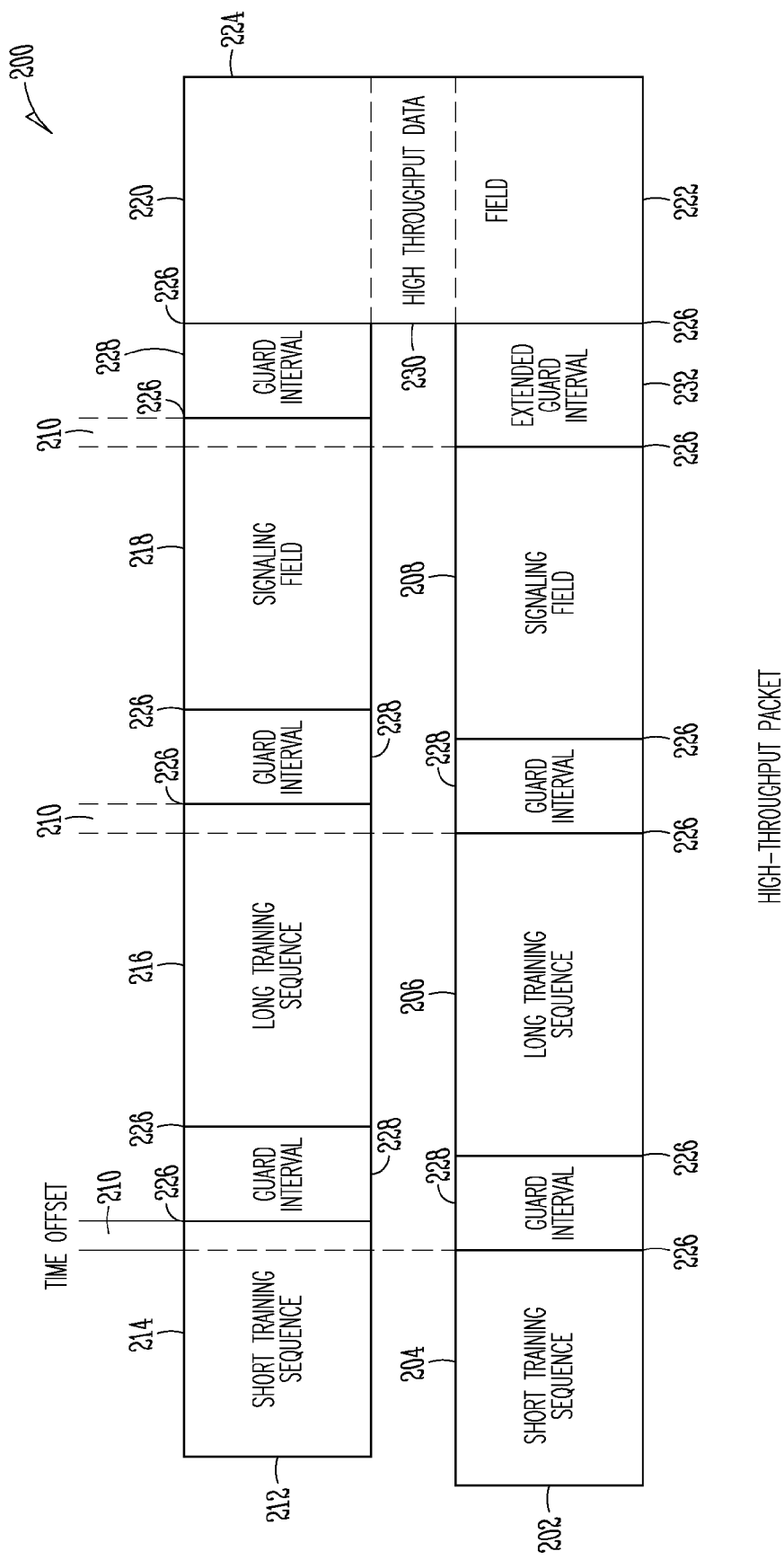
FIG. 2 illustrates a high-throughput packet in accordance with some embodiments of the present invention.

FIG. 2 illustrates a high-throughput packet in accordance with some embodiments of the present invention. High-throughput packet 200 is an example of a high-throughput packet suitable for transmission and/or reception by a high-throughput communication station, such as high-throughput communication station 100 (FIG. 1).

High-throughput packet 200 may comprise portions transmitted on one or more subchannels 202 and 212 of a high-throughput communication channel. Although only two subchannels are illustrated, the scope of the invention is not limited in this respect. High-throughput packet 200 may comprise training fields 204 and 206 and signaling field 208 on first subchannel 202, and training fields 214 and 216 and signaling field 218 on second subchannel 212. High-throughput packet 200 may also comprise high-throughput data field 220 on more than one subchannel. High-throughput data field 220 may include portion 222 on first subchannel 202 and portion 224 on second subchannel 212. In some embodiments, high-throughput data field 220 may include portion 230 on frequency spectrum (e.g., all or some of the unused subcarriers) in between subchannels 202 and 212. Symbol boundaries 226 may be used to determine the beginning and/or endings of the portions of high-throughput packet 200.

In accordance with some embodiments of the present invention, high-throughput packet 200 may be transmitted with time offset 210 between some portions of the packet transmitted on a first subchannel 202 and some portions of the packet transmitted on a second subchannel 212. Time offset 210 may convey additional signaling information to a receiving communication station.

In some embodiments, guard intervals 228 may be between some of the fields of packet 200. To compensate for time offset 210, extended guard interval 232 may be included on one or more of the subchannels so that portions 222, 224 and 230 of high-throughput data field 220 may be substantially time-synchronized.

Although time offset 210 is illustrated as a delay between portions 214, 216 and 218 transmitted on subchannel 212 and corresponding portions transmitted on subchannel 202, this is not a requirement. In some embodiments, time offset 210 may be provided at other portions of packet 200. For example, instead of delaying portions 214, 216 and 218 by time offset 210, portions 214 and 204 may be transmitted simultaneously, and time offset 210 may be provided before another portion on subchannel 212, including before or after one or more of guard intervals 228, although the scope of the invention is not limited in this respect. In some other embodiments, time offset 210 may be provided within one of portions 214, 216 and 218, although the scope of the invention is not limited in this respect.

In some embodiments, first portions 204, 206 and 208 of high-throughput packet 200 may be transmitted on first subchannel 202 of a high-throughput channel, and second portions 214, 216 and 218 of high-throughput packet 200 may be transmitted on second subchannel 212. In these embodiments, some portions on subchannel 212 may be transmitted with the time offset 210 with respect to the transmitting of corresponding portions on subchannel 202. Third portions 220 may be transmitted on both first and second subchannels 202 and 212 without time offset 210 therebetween. In these embodiments, time offset 210 may convey at least one bit of signaling information to a high-throughput receiving station by detection of time offset 210. In some embodiments, the at least one bit of signaling information may be in addition to the signaling information conveyed to a conventional communication station. In some embodiments, time offset 210 may be measured by the receiving communication station and compared with one or more threshold values of the time offset to determine the value being signaled thereto.

In some embodiments, portions 204, 206 and 208 may be substantially identical in content to corresponding portions 214, 216 and 218, although the scope of the invention is not limited in this respect. In some embodiments, portions 204 and 206 may comprise training fields, portion 208 may comprise a signaling field, portions 214 and 216 may comprise training fields and portion 218 may comprise a signaling field. In some embodiments, the training fields may comprise one or more training sequences of training symbols having predetermined values. In some embodiments, third portions 220 may comprise a high-throughput data field to convey high-throughput data.

The training sequences may allow a receiving station to perform frequency offset estimations, automatic gain control (AGC) and/or frame detection. In some embodiments, symbol boundaries 226 of a frame portion may be detected when a correlation between training symbols exceeds a predetermined threshold. These symbol boundaries, for example, may be used to determine the time offset at a receiving station.

Although packet 200 is illustrated with both short and long training sequences transmitted respectively in portions 204 and 206, and respectively in portions 214 and 216, this is not a requirement. In some embodiments, packet 200 may include a single training sequence transmitted in a single training field of each subchannel.

In some embodiments, a single bit of signaling information may be conveyed to a receiving station by transmitting high-throughput packet 200 with time offset 210 having a duration exceeding a first predetermined value. The duration may, for example, range from 150 to 250 ns, although the scope of the invention is not limited in this respect. In these embodiments, guard interval 228 may range from about 7 to 9 microseconds, although the scope of the invention is not limited in this respect. In some embodiments, a receiving station may determine the duration of time offset 210. When the duration exceeds a first predetermined value, a single bit of signaling information may be received.

In some embodiments, signaling information may be conveyed to a receiving station by transmitting high-throughput packet 200 with time offset 210 either having a duration between a first predetermined value and a second predetermined value, or having a duration greater than the second predetermined value. In these embodiments, the first predetermined value may range, for example, from 150 to 250 ns and the second predetermined value may range from 350 to 450 ns, although the scope of the invention is not limited in this respect.

In some embodiments, two-bits of signaling information may be conveyed to a receiving station by transmitting high-throughput packet 200 with time offset 210 having a duration between various threshold values. For example, to convey two-bits, the duration may be between a first and a second predetermined value, the duration may be between the second and a third predetermined value, or the duration may be between the third and a fourth predetermined value.

In some embodiments, time offsets of varying duration may be provided between the various fields of high-throughput packet 200 to convey additional information. For example, a time offset between corresponding training fields 204 and 214 of the different subchannels may be different from a time offset between corresponding training fields 206 and 216 or corresponding signaling fields 208 and 218 of the different subchannels.

In some embodiments, high-throughput packet 200 may comprise training fields 204, 214, 206, 216 comprising one or more training sequences, signaling fields 208 and 218 comprising signaling information, and high-throughput data field 220 comprising high-throughput data. In these embodiments, substantially identical versions of the training sequences and the signaling information may be transmitted on subchannels 202 and 212. In some embodiments, the signaling information may comprise format, rate and length information for the high-throughput data field 220. In some embodiments, high-throughput data field 220 may have differing data portions 222 and 224 transmitted respectively on subchannels 202 and 212.

In some embodiments, training fields 204 and 206 and signaling field 208 may be received by non-high-throughput communication stations (e.g., legacy stations) on subchannel 202. Training fields 214 and 216 and signaling field 218 may also be received independently by one or more non-high-throughput communication stations on subchannel 212. In these embodiments, the training fields and the signaling fields may be compatible with non-high-throughput communication stations. In these embodiments, the non-high-throughput communication stations may enter a receiving state (to refrain from transmitting) in response to length information in the signaling field and may refrain from communicating on the associated subchannel for that time. Accordingly, a non-high-throughput communication station may refrain from transmitting during high-throughput data field 220.

In some embodiments, signaling fields 208 and 218 may convey to a high-throughput receiving station that packet 200 is a high-throughput packet. In these embodiments, one of signaling fields 208 and 218 may convey to a non-high-throughput receiving station that a corresponding portion of high-throughput data field 220 is not compatible for receipt by the non-high-throughput receiving station, although the scope of the invention is not limited in this respect.

In some embodiments, portion 230 of high-throughput data field 220 may be transmitted on at least some unused subcarriers in between first and second subchannels 202 and 212 of the high-throughput channel. Portion 230 may be transmitted substantially synchronously with high-throughput data fields 222 and 224.

Figure 3:
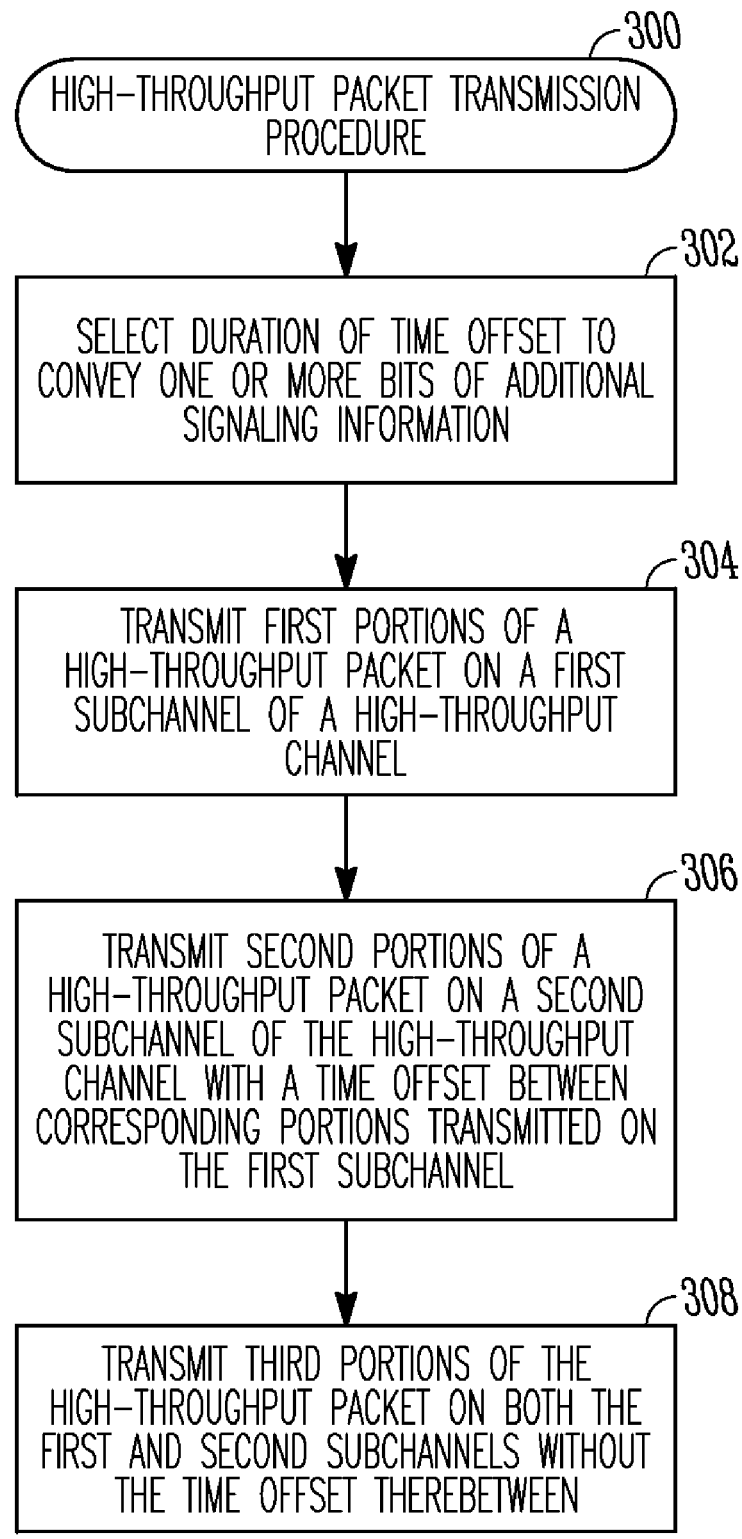
FIG. 3 is a flow chart of a high-throughput packet transmission procedure in accordance with some embodiments of the present invention.

FIG. 3 is a flow chart of a high-throughput packet transmission procedure in accordance with some embodiments of the present invention. High-throughput transmission procedure 300 may be performed by a high-throughput communication station, such as high-throughput communication station 100 (FIG. 1), although other communication stations may also be suitable. A high-throughput communication station performing procedure 300 may be referred to as a transmitting station.

Operation 302 comprises selecting a time offset to convey one or more bits of signaling information. In some embodiments, operation 302 may select a time offset having at least a first predetermined duration to convey one bit of signaling information. In some embodiments, operation 302 may select a time offset having either a duration between a first predetermined duration and a second predetermined duration, or a duration greater than the second predetermined duration to convey signaling information. In some embodiments, operation 302 may vary a duration of the time offset between portions of a high-throughput packet to convey further additional signaling information.

Operation 304 comprises transmitting first portions of a high-throughput packet on a first subchannel of a high-throughput communication channel. In some embodiments, the first portions may include training fields, such as training fields 204 and 206 (FIG. 2) and a signaling field, such as signaling field 208 (FIG. 2).

Operation 306 comprises transmitting second portions of the high-throughput packet on a second subchannel of the high-throughput communication channel. In some embodiments, the second portions may include training fields, such as training fields 214 and 216 (FIG. 2) and a signaling field, such as signaling field 218 (FIG. 2). The second portions may be transmitted with the time offset selected in operation 302 with respect to the first portions transmitted in operation 304.

Operation 306 may be performed before the completion of operation 304 because the time offset between the first and second portions of the high-throughput packet may be significantly less than the duration of the first portions. In this way, operations 304 and 306 may be performed substantially concurrently to transmit corresponding portions a high-throughput packet, such as packet 200 (FIG. 2), on the first and second subchannels. Accordingly, the portions transmitted on the second subchannel are only delayed by the time offset with respect to the portions transmitted on the first subchannel.

Operation 308 comprises transmitting third portions of the high-throughput packet on both the first and second subchannels without the time offset therebetween. In some embodiments, the third portions may include data portions, such as data portions 222 and 224 (FIG. 2). In some embodiments, the third portions may also data portion 230 (FIG. 2).

Although the individual operations of procedure 300 are illustrated and described as separate operations, one or more of the individual operations may be performed concurrently, and nothing requires that the operations be performed in the order illustrated.

Figure 4:
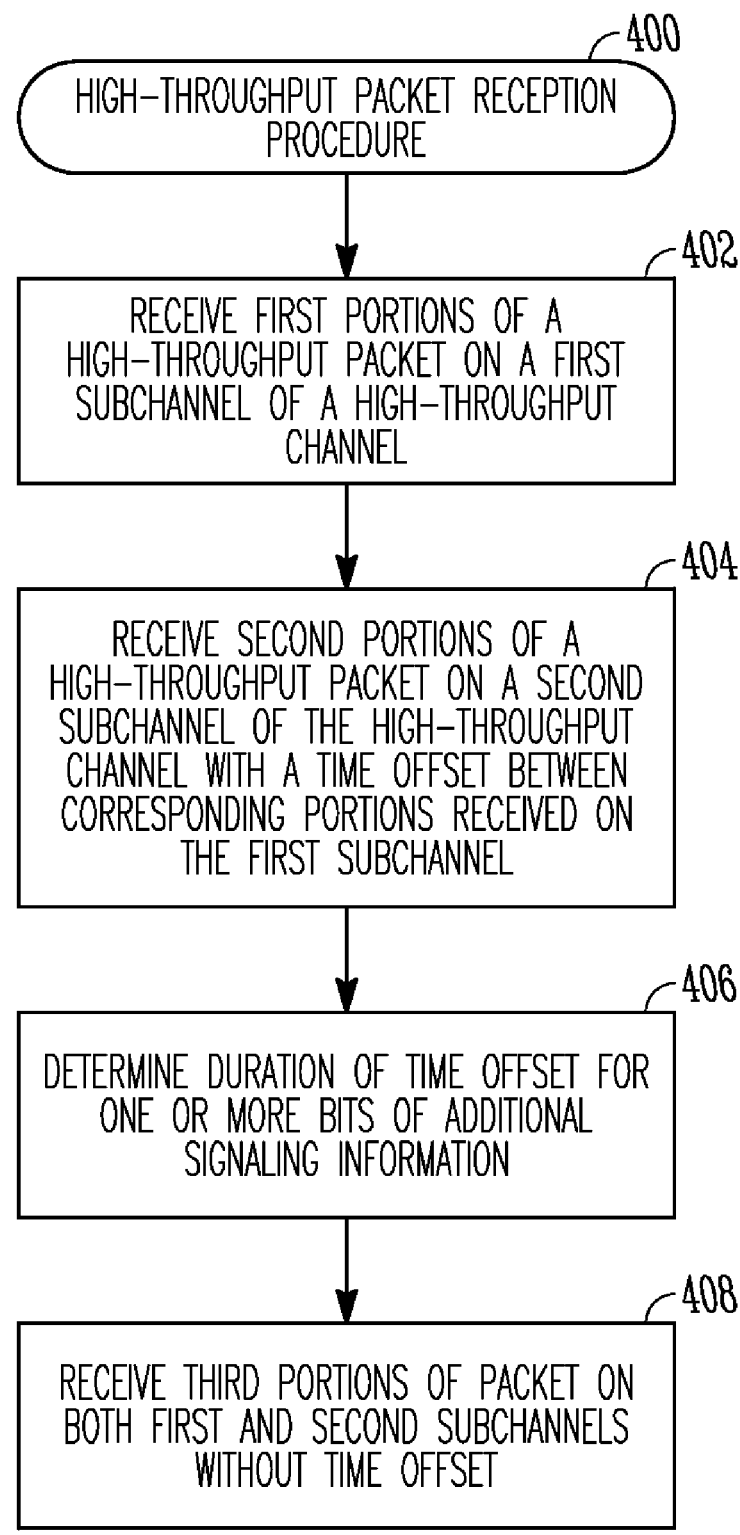
FIG. 4 is a flow chart of a high-throughput packet reception procedure in accordance with some embodiments of the present invention.

FIG. 4 is a flow chart of a high-throughput packet reception procedure in accordance with some embodiments of the present invention. High-throughput reception procedure 400 may be performed by a high-throughput communication station, such as high-throughput communication station 100 (FIG. 1), although other communication stations may also be suitable. A high-throughput communication station performing procedure 400 may be referred to as a receiving station.

Operation 402 comprises receiving first portions of a high-throughput packet on a first subchannel of a high-throughput communication channel. In some embodiments, the first portions may include training fields, such as training fields 204 and 206 (FIG. 2) and a signaling field, such as signaling field 208 (FIG. 2).

Operation 404 comprises receiving second portions of the high-throughput packet on a second subchannel of the high-throughput communication channel. In some embodiments, the second portions may include training fields, such as training fields 214 and 216 (FIG. 2) and a signaling field, such as signaling field 218 (FIG. 2). The second portions may be received with a time offset with respect to the first portions transmitted in operation 402.

Operation 404 may be performed before the completion of operation 402 because the time offset between the first and second portions of the high-throughput packet may be significantly less than the duration of the first portions. In this way, operations 402 and 404 may be performed substantially concurrently to receive corresponding portions a high-throughput packet, such as packet 200 (FIG. 2), on the first and second subchannels. Accordingly, the portions received on the second subchannel are only delayed by the time offset with respect to the portions received on the first subchannel.

Operation 406 comprises determining a duration of the time offset so that one or more bits of signaling information may be conveyed to the receiving station. In some embodiments, operation 406 may determine when the time offset has at least a first predetermined duration so that one bit of signaling information may be received. In some embodiments, operation 406 may determine when the time offset has either a duration between a first predetermined duration and a second predetermined duration, or a duration greater than the second predetermined duration so that signaling information may be received to the receiving station. In some embodiments, operation 406 may determine how the duration may vary between portions of the high-throughput packet so that additional signaling information may be received.

Operation 408 comprises receiving third portions of the high-throughput packet on both the first and second subchannels without the time offset therebetween. In some embodiments, the third portions may include data portions, such as data portions 222 and 224 (FIG. 2). In some embodiments, the third portions may also data portion 230 (FIG. 2).

Although the individual operations of procedure 400 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method for transmitting over a high-throughput communication channel comprising:

transmitting a high-throughput packet with a time offset between some portions of the packet transmitted on a first subchannel and some portions of the packet transmitted on a second subchannel, the time offset to convey additional signaling information,
wherein transmitting comprises:
transmitting first portions of the high-throughput packet on the first subchannel of the high-throughput channel;
transmitting second portions of the high-throughput packet on the second subchannel of the high-throughput channel, wherein the second portions are transmitted with the time offset with respect to the transmitting of the first portions; and
transmitting third portions on both the first and second subchannels without the time offset therebetween, the time offset to convey at least one bit of additional signaling information to a high-throughput receiving station by detection of the time offset.

2. The method of claim 1 wherein the first portions of the high-throughput packet are substantially identical to corresponding ones of the second portions of the high-throughput packet,
wherein the first portions comprise first training fields and a first signaling field, and
wherein the second portions comprise second training fields and a second signaling field.

3. The method of claim 2 wherein the first training fields and second training fields each comprise a training sequence of predetermined training values, and
wherein the third portions comprise a high-throughput data field to convey high-throughput data.

4. The method of claim 1 wherein the high-throughput channel comprises two frequency separated subchannels, the time offset being between corresponding fields of the two subchannels,
wherein the subchannels are orthogonal frequency division multiplexed channels.

5. The method of claim 4 wherein each subchannel comprises a plurality of orthogonal frequency division multiplexed subcarriers, and
wherein each orthogonal frequency division multiplexed subcarrier has a null at substantially a center frequency of the other subcarriers to achieve substantial orthogonality between the subcarriers of the associated subchannel.

6. A method for transmitting over a high-throughput communication channel comprising:
transmitting a high-throughput packet with a time offset between some portions of the packet transmitted on a first subchannel and some portions of the packet transmitted on a second subchannel, the time offset to convey additional signaling information; and
conveying a single bit of signaling information to a receiving station by transmitting the high-throughput packet with the time offset having a duration exceeding a first predetermined value.

7. A method for transmitting over a high-throughput communication channel comprising:
transmitting a high-throughput packet with a time offset between some portions of the packet transmitted on a first subchannel and some portions of the packet transmitted on a second subchannel, the time offset to convey additional signaling information; and
conveying two-bits of signaling information to a receiving station by transmitting the high-throughput packet with the time offset having a duration that varies between a first and a second predetermined value, the second and a third predetermined value, or the third and a fourth predetermined value.

8. The method of claim 2 further comprising:
transmitting a high-throughput packet with a time offset between some portions of the packet transmitted on a first subchannel and some portions of the packet transmitted on a second subchannel, the time offset to convey additional signaling information; and
transmitting high-throughput data fields of the high-throughput packet on the first and second subchannels without the time offset between.

9. The method of claim 8 further comprising transmitting additional data portions on subcarriers in between the first and second subchannels of the high-throughput channel,
wherein the additional data portions are transmitted substantially synchronously with the high-throughput data fields.

10. A method for transmitting over a high-throughput communication channel comprising:
transmitting a high-throughput packet with a time offset between some portions of the packet transmitted on a first subchannel and some portions of the packet transmitted on a second subchannel, the time offset to convey additional signaling information,
wherein the high-throughput packet comprises training fields comprising training sequences, a signaling field comprising signaling information, and a high-throughput data field,
wherein the training sequences and the signaling information are transmitted on the more than one subchannel comprising the high-throughput channel,
wherein the signaling information comprises format, rate and length information for the high-throughput data field,
wherein the high-throughput data field has differing data portions transmitted on the more than one subchannel comprising the high-throughput channel.

11. The method of claim 10 wherein a non-high-throughput communication station enters a receiving state in response to determining the length information from the signaling field, the non-high-throughput communication station refraining from transmitting during the high-throughput data field.

12. A method for transmitting over a high-throughput communication channel comprising:
transmitting a high-throughput packet with a time offset between some portions of the packet transmitted on a first subchannel and some portions of the packet transmitted on a second subchannel, the time offset to convey additional signaling information,
wherein the transmitting is performed by a first communication station transmitting a first high-throughput packet with a first time offset between some portions on the first subchannel and some portions of the packet on the second subchannel,
wherein the time offset is to convey first additional signaling information to a second communication station, and
wherein the method further comprises receiving a second high-throughput packet from the second communication station with a second time offset between some portions on the first subchannel and some portions of the second packet on the second subchannel, and
wherein the second time offset is to convey second additional signaling information to the first communication station.

13. A method for receiving comprising:
receiving a high-throughput packet with a time offset between some portions of the packet on a first subchannel and some portions of the packet on a second subchannel, the time offset conveying additional signaling information,
wherein receiving comprises:
receiving first portions of the high-throughput packet on the first subchannel of a high-throughput channel;
receiving second portions of the high-throughput packet on the second subchannel of the high-throughput channel, wherein the second portions are received with the time offset with respect to the receiving of the first portions; and
receiving third portions of the high-throughput packet on both the first and second subchannels without the time offset therebetween, the time offset conveying at least one bit of additional signaling information to a high-throughput receiving station by detection of the time offset.

14. The method of claim 13 further comprising:
receiving a high-throughput packet with a time offset between some portions of the packet on a first subchannel and some portions of the packet on a second subchannel, the time offset conveying additional signaling information;
receiving high-throughput data fields of the high-throughput packet on the first and second subchannels without the time offset between; and
receiving additional data portions on subcarriers in between the first and second subchannels of the high-throughput channel, wherein the data portions are received substantially with the high-throughput data fields.

15. The method of claim 13 wherein the first portions of the high-throughput packet are substantially identical to corresponding ones of the second portions of the high-throughput packet,
wherein the first portions comprise first training fields and a first signaling field,
wherein the second portions comprise second training fields and a second signaling field.

16. A method for receiving comprising:
receiving a high-throughput packet with a time offset between some portions of the packet on a first subchannel and some portions of the packet on a second subchannel, the time offset conveying additional signaling information; and
determining a duration of the time offset to receive two-bits of signaling information, wherein the time offset has a duration between a first and a second predetermined value, a duration between the second and a third predetermined value, or a duration between the third and a fourth predetermined value.

17. A method for receiving comprising:
receiving a high-throughput packet with a time offset between some portions of the packet on a first subchannel and some portions of the packet on a second subchannel, the time offset conveying additional signaling information,
wherein the high-throughput packet comprises training fields comprising training sequences, a signaling field comprising signaling information, and a high-throughput data field,
wherein the training sequences and the signaling information are received on the more than one subchannel comprising the high-throughput channel,
wherein the signaling information comprises format, rate and length information for the high-throughput data field,
wherein the high-throughput data field has differing data portions to be received on the more than one subchannel comprising the high-throughput channel.

18. A communication station comprising:
a transmitter to transmit a high-throughput packet with a time offset between some portions of the packet on a first subchannel and some portions of the packet on a second subchannel; and
processing circuitry to instruct the transmitter to transmit the high-throughput packet with the time offset between the some portions, wherein the time offset is to convey additional signaling information to another communication station,
wherein the communication station is a first communication station, the another communication station is a second communication station, the high-throughput packet is a first high-throughput packet, and the time offset is a first time offset,
wherein the first communication station further comprises a receiver to receive a second high-throughput packet from the second communication station with a second time offset between some portions of the second packet on the first subchannel and some portions of the second packet on the second subchannel, the second time offset to convey additional signaling information to the first communication station, and
wherein the processing circuitry is to identify the second time offset.

19. A communication station comprising:
a transmitter to transmit a high-throughput packet with a time offset between some portions of the packet on a first subchannel and some portions of the packet on a second subchannel; and
processing circuitry to instruct the transmitter to transmit the high-throughput packet with the time offset between the some portions, wherein the time offset is to convey additional signaling information to another communication station,
wherein the transmitter transmits first portions of the high-throughput packet on the first subchannel of a high-throughput channel,
wherein the transmitter transmits second portions of the high-throughput packet on the second subchannel of the high-throughput channel, wherein the second portions are transmitted with the time offset with respect to the transmitting of the first portions,
wherein the transmitter transmits third portions on both the first and second subchannels without the time offset therebetween, and
the processing circuitry conveys at least one bit of additional signaling information to a high-throughput receiving station by the time offset.

20. The communication station of claim 19 wherein the first portions of the high-throughput packet are substantially identical to corresponding ones of the second portions of the high-throughput packet,
wherein the first portions comprise first training fields and a first signaling field,
wherein the second portions comprise second training fields and a second signaling field, and
wherein the third portions comprise a high-throughput data field to convey high-throughput data.

21. The communication station of claim 20 wherein the high-throughput channel comprises two frequency separated subchannels, the time offset being between corresponding fields of the subchannels, wherein the subchannels are orthogonal frequency division multiplexed channels, wherein each subchannel comprises a plurality of orthogonal frequency division multiplexed subcarriers, and wherein each orthogonal frequency division multiplexed subcarrier has a null at substantially a center frequency of the other subcarriers to achieve substantial orthogonality between the subcarriers of the associated subchannel.

22. A communication station comprising:

a transmitter to transmit a high-throughput packet with a time offset between some portions of the packet on a first subchannel and some portions of the packet on a second subchannel; and processing circuitry to instruct the transmitter to transmit the high-throughput packet with the time offset between the some portions, wherein the time offset is to convey additional signaling information to another communication station, wherein the processing circuitry conveys two-bits of signaling information to the other station by instructing the transmitter to transmit the high-throughput packet with the time offset having predetermined value, between the second and a third predetermined value, or between the third and a fourth predetermined value.

23. A communication station comprising:

a receiver to receive a high-throughput packet with a time offset between some portions of the packet received on a first subchannel and some portions of the packet received on a second subchannel; and processing circuitry to determine the time offset between portions on the first subchannel and the portions on the second subchannel, the time offset to convey additional signaling information to the communication station, wherein the communication station is a first communication station which receives the high-throughput packet from a second communication station, and wherein the high-throughput packet is a first high-throughput packet, and the time offset is a first time offset, wherein the first communication station further comprises a transmitter to transmit a second high-throughput packet with a second time offset between some portions of the second packet on the first subchannel and some portions of the second packet on the second subchannel, the second time offset to convey additional signaling information to the second communication station, and wherein the processing circuitry is to select the second time offset.

24. A communication station comprising:

a receiver to receive a high-throughput packet with a time offset between some portions of the packet received on a first subchannel and some portions of the packet received on a second subchannel; and processing circuitry to determine the time offset between portions on the first subchannel and the portions on the second subchannel, the time offset to convey additional signaling information to the communication station, wherein the receiver receives first portions of the high-throughput packet on the first subchannel of a high-throughput channel, wherein the receiver receives second portions of the high-throughput packet on the second subchannel of the high-throughput channel, wherein the second portions are received with the time offset with respect to the receiving of the first portions, wherein the receiver receives third portions of the high-throughput packet on both the first and second subchannels without the time offset therebetween, and the processing circuitry determines at least one bit of additional signaling information by the time offset.

25. The communication station of claim 24 wherein the first portions of the high-throughput packet are substantially identical to corresponding ones of the second portions of the high-throughput packet, wherein the first portions comprise first training fields and a first signaling field, wherein the second portions comprise second training fields and a second signaling field, and wherein the third portions comprise a high-throughput data field to convey high-throughput data.

26. The communication station of claim 25 wherein the high-throughput channel comprises two frequency separated subchannels, the time offset being between corresponding fields the subchannels, wherein the subchannels are orthogonal frequency division multiplexed channels, wherein each subchannel comprises a plurality of orthogonal frequency division multiplexed subcarriers, and wherein each orthogonal frequency division multiplexed subcarrier has a null at substantially a center frequency of the other subcarriers to achieve substantial orthogonality between the subcarriers of the associated subchannel.

27. A communication station comprising:

a receiver to receive a high-throughput packet with a time offset between some portions of the packet received on a first subchannel and some portions of the packet received on a second subchannel; and processing circuitry to determine the time offset between portions on the first subchannel and the portions on the second subchannel, the time offset to convey additional signaling information to the communication station, wherein the processing circuitry determines two-bits of signaling information conveyed by other station by determining whether the time offset has a duration between a first and a second predetermined value, has the duration between the second and a third predetermined value, or has the duration between the third and a fourth predetermined value.

28. A system comprising:

a substantially omnidirectional antenna;

a transmitter to transmit a high-throughput packet using the antenna, the packet having with a time offset between some portions of the packet transmitted on a first subchannel and some portions of the packet transmitted on a second subchannel; and processing circuitry to instruct the transmitter to transmit the high-throughput packet with the time offset between the portions, wherein the time offset is to convey additional signaling information to another communication station, wherein the high-throughput packet is a first high-throughput packet and the time offset is a first time offset, wherein the system further comprises:

a receiver to receive a second high-throughput packet from the other communication station with a second time offset between some portions on the first subchannel and some portions of the second packet on the second subchannel, the second time offset conveying additional signaling information, and wherein the processing circuitry is to identify the second time offset.

29. A system comprising:

a substantially omnidirectional antenna;

a transmitter to transmit a high-throughput packet using the antenna, the packet having with a time offset between some portions of the packet transmitted on a first subchannel and some portions of the packet transmitted on a second subchannel; and processing circuitry to instruct the transmitter to transmit the high-throughput packet with the time offset between the portions, wherein the time offset is to convey additional signaling information to another communication station, wherein the transmitter transmits first portions of the high-throughput packet on the first subchannel of a high-throughput channel, wherein the transmitter transmits second portions of the high-throughput packet on the second subchannel of the high-throughput channel, wherein the second portions are transmitted with the time offset with respect to the transmitting of the first portions, wherein the transmitter transmits third portions of the high-throughput packet on both the first and second subchannels without the time offset therebetween, and the processing circuitry conveys at least one bit of additional signaling information to a high-throughput receiving station by the time offset.

30. A computer-readable medium that stores instructions for execution by one or more processors to perform operations comprising:

transmitting a high-throughput packet with a time offset between some portions of the packet transmitted on a first subchannel and some portions of the packet transmitted on a second subchannel, the time offset to convey additional signaling information, wherein the transmitting is performed by a first communication station transmitting a first high-throughput packet with a first time offset between some portions on a first subchannel and some portions of the packet on a second subchannel, the first time offset conveying first additional signaling information to a second communication station, and wherein the operations further comprise:

receiving a second high-throughput packet from the second communication station with a second time offset between some portions on the first subchannel and some portions of the second packet on the second subchannel, the second time offset conveying second additional signaling information to the first communication station.

31. A computer-readable medium that stores instructions for execution by one or more processors to perform operations comprising:

transmitting a high-throughput packet with a time offset between some portions of the packet transmitted on a first subchannel and some portions of the packet transmitted on a second subchannel, the time offset to convey additional signaling information;

transmitting first portions of the high-throughput packet on the first subchannel of a high-throughput channel;

transmitting second portions of the high-throughput packet on the second subchannel of the high-throughput channel, wherein the second portions are transmitted with the time offset with respect to the transmitting of the first portions; and transmitting third portions of the high-throughput packet on both the first and second subchannels without the time offset therebetween, the time offset conveying at least one bit of additional signaling information to a high-throughput receiving station by detection of the time offset.

* * * * *

UNITED STATES PATENT AND TRADEMARK OFFICE
CERTIFICATE OF CORRECTION

| | | |
|---|---|---|
| PATENT NO. | : 7,423,968 B2 | Page 1 of 1 |
| APPLICATION NO. | : 10/806893 | |
| DATED | : September 9, 2008 | |
| INVENTOR(S) | : Stephens | |

It is certified that error appears in the above-identified patent and that said Letters Patent is hereby corrected as shown below:

In column 1, lines 11-12, after "reference." delete "communications, and in some embodiments, to multicarrier communications.".

In column 13, line 24, in Claim 22, after "having" insert -- a duration that varies between a first and a second --.

Signed and Sealed this

Second Day of December, 2008

JON W. DUDAS
*Director of the United States Patent and Trademark Office*